H. EDDY.
Horse Stall.
No. 16,357.
Patented Jan. 6, 1857.
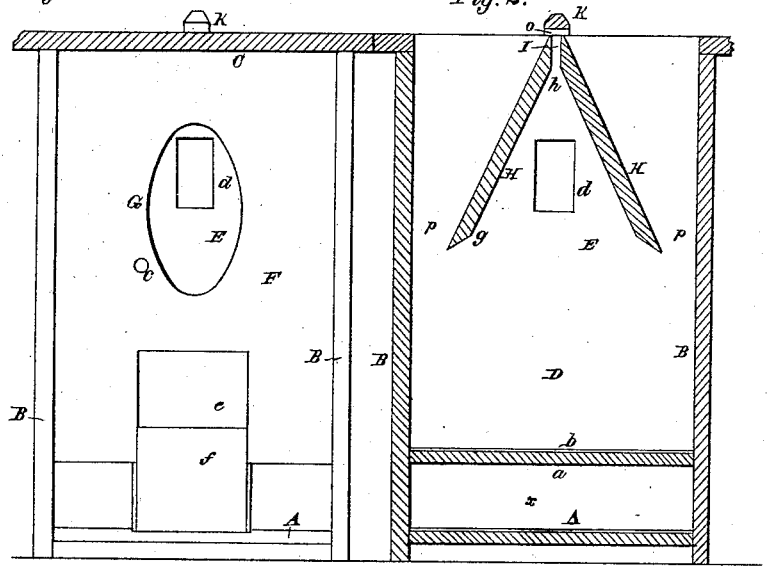

UNITED STATES PATENT OFFICE.

HENRY EDDY, OF NORTH BRIDGEWATER, MASSACHUSETTS.

MODE OF CONSTRUCTING STALLS FOR HORSES.

Specification forming part of Letters Patent No. 16,357, dated January 6, 1857; Reissued April 8, 1862, No. 1,300.

*To all whom it may concern:*

Be it known that I, HENRY EDDY, M. D., of North Bridgewater, in the county of Plymouth and State of Massachusetts, have invented a new and useful Mode of Constructing Stalls for Horses; and I do hereby declare that the same is fully described and represented in the following specification and the accompanying drawings, letters, figures, and references thereof.

Of the said drawings, Figure 1 denotes a front view of the stall; Fig. 2, a vertical and transverse section of it taken through the manger; Fig. 3, a top view of the stall, and Fig. 4 a central and longitudinal vertical section of it.

My design in this invention is to construct a horse-stall in such a manner that the horse may be fed without the possibility of depositing hay-seed or other matter upon the head or foretop of the horse, and in such manner that the horse shall not breathe upon his hay nor waste a particle of his food.

In carrying out my invention I dispense entirely with the rack and shallow manger which are commonly used.

I construct a stall (aside from the crib or manger to which my improvement is chiefly confined) of wooden boards in the form of a box which is somewhat irregular with the rear end open for the entrance of the horse into the stall. The stall is formed of the following parts, viz: the beveling floor A, upon which the horse stands; the sides or partitions B, B, which inclose it or form a wall of separation between adjoining stalls; the front E, (with a window $d$ in it,) which is formed by the side of the stable, and the top or upper floor C. As my improvement is confined chiefly to the crib or manger I will proceed to give a particular description of it.

I construct the crib D as follows: The front of the crib or manger is formed by the side of the stable E, with a window $d$ in it for the more perfect ventilation of the stall, as seen in Fig. 1. The back or rear part of the crib or manger is formed by the partition F, with an oblong hole in it for the insertion of the head and neck of the horse, which partition separates the crib from the main body of the stall. This inner wall F of the crib is arranged and constructed in this manner to prevent the horse from throwing his head around and dropping any of his food by his side or under his feet. This wall or partition has also the hole $e$ made in it for the purpose of clearing the crib as occasion requires of refuse matter. The hole $e$ is for inserting and tying the halter. The slide $f$ is employed to close the opening which is made for the purpose of clearing the manger. The bottom or floor of the crib $(a)$ is covered with a metallic plate $(b)$, as seen in Figs. 2 and 4, to keep the same sweet and clean and to prevent the horse from gnawing the floor of the crib. The space $x$ beneath the manger is for the purpose of storing the bedding of the horse. The sides of the crib at the right and left of the oblong opening G are formed by the sides of the stall B, B, which extend the entire length of the stall (properly so called) and crib. The inclined planes H, H, are so placed as to leave the space or vertical opening I as seen in Figs. 2 and 4 and also in Fig. 3, where the cap is represented as broken to show said opening I. These inclined planes are employed to convey the food of the horse away from his head to prevent the soiling of his head and foretop and to prevent the frightening of the horse by a sudden dropping of his food into the manger. The cap K is employed as a covering to the opening I for the purpose of preventing the deposit of hay seed and other matter upon the head of the horse. The space $o$ beneath the cap K and above the opening I allows a ready escape of the breath of the horse. The space $g$, $h$, $k$, formed by the inclined planes H, H, constitutes a space where the horse can breathe away from his food, and he does not breathe upon it or soil it as in the common rack or manger. The inclined planes H, H, form a temporary resting place for the hay which is fed to the horse, and the hay descends lower and lower upon these inclined planes as the horse eats or takes away the hay through the openings $p$, $p$, as seen in Figs. 2 and 3. The openings $p$, $p$, as seen in Figs. 2 and 3, are designed to be so contracted as to allow the horse to pull down hay as he needs it and no faster, as the hay is conveyed to the sides of the crib, to the right and left, from the center, upon the inclined planes and rests against the sides B, B, until it is eaten. The horse does not breathe upon it or through it as when it lies in a rack or manger before him. Cut feed or grain as fed to the horse readily descends upon the inclined planes H, H, and is conveyed to the sides B, B of the crib, where it can be reached by the horse, and is not in the central part of the floor of the crib, where it would be soiled by constant mouthing.

$r$, $r$, are pins extending through holes $s$, $s$ into the cap R to hold it in place, as seen in Fig. 4.

The same general results which have been described may be secured by other modes of construction which are analogous. For instance, dispensing with one of the inclined planes H in Fig. 2 the other inclined plane H may be extended upward in the same direction until it reaches a point over the side B, and the side B may be extended upward until it approaches very near to the inclined plane H, with an opening between them similar to the opening I, which is seen in Figs. 2, 3, and 4, which shall answer a similar purpose. The parallel sides of the angular space formed in part by the inclined plane H and the side B (as it rises above the top or upper floor C) are formed by the side of the stable E, and by the addition of a side opposite and parallel to it.

The advantages to be derived from the use of this stall are the following: 1, the crib is easily cleared of refuse matter; 2, the horse is so inclosed that he has no communication whatever with any horse which may occupy an adjacent stall; 3, the urine readily passes off from the beveling floor in the rear of the horse; 4, the stall is abundantly ventilated; 5, the head of the horse is not soiled when he is fed; 6, the horse cannot soil his hay by breathing upon it and thus render it unpalatable; 7, he cannot waste a particle of his food.

I claim nothing original in the construction of the main body of the stall which has been described and nothing original in the construction of a deep crib or manger with an oblong hole for the insertion of the head and neck of the horse.

What I claim and desire to secure by Letters Patent is—

A crib or manger with the inclined planes H H constructed and arranged substantially as described, also the space $g$, $h$, $k$, partially inclosed by the inclined planes H, H, with a vertical opening I substantially as described and for the purposes herein set forth.

In testimony whereof I have set my hand this tenth day of December, A. D. 1856.

HENRY EDDY.

Witnesses:
   CHARLES LINCOLN,
   FRANCIS P. HOLMES.

[FIRST PRINTED 1912.]